June 1, 1965     J. O. JAMES     3,186,156
TIMEPIECE MOVEMENT FOR INERTIAL SYSTEM
Filed May 8, 1962     3 Sheets-Sheet 1

INVENTOR
John O. James,
BY Diggins + LeBlanc
ATTORNEYS

INVENTOR
John O. James,
BY Diggins + LeBlanc
ATTORNEYS

June 1, 1965 J. O. JAMES 3,186,156
TIMEPIECE MOVEMENT FOR INERTIAL SYSTEM
Filed May 8, 1962 3 Sheets-Sheet 3
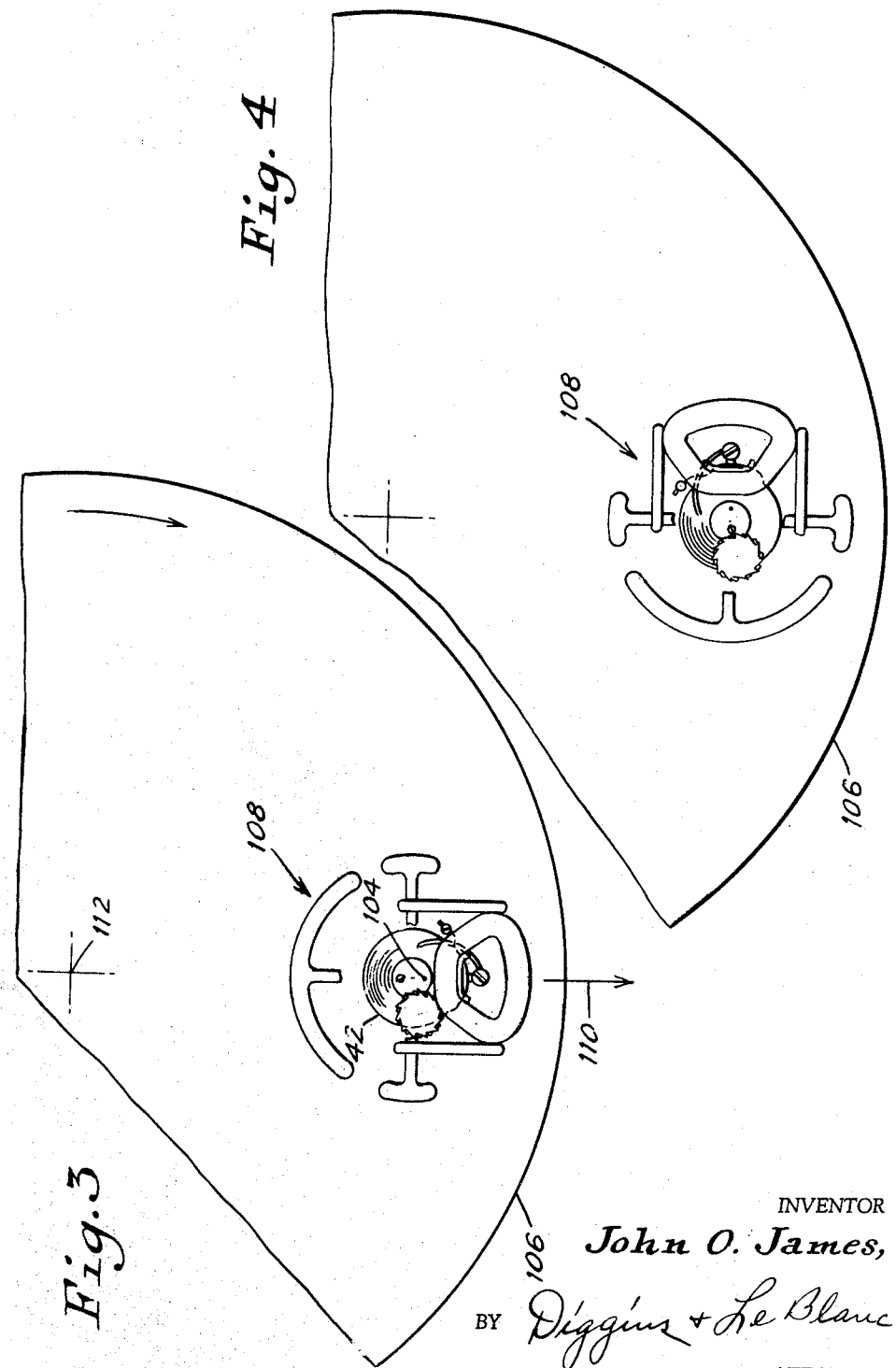
INVENTOR
John O. James,
BY Diggins + Le Blanc
ATTORNEYS

United States Patent Office 3,186,156
Patented June 1, 1965

3,186,156
TIMEPIECE MOVEMENT FOR INERTIAL SYSTEM
John O. James, Lancaster, Pa., assignor to Hamilton Watch Company, Lancaster, Pa., a corporation of Pennsylvania
Filed May 8, 1962, Ser. No. 193,260
10 Claims. (Cl. 58—28)

This invention relates to self-starting balance assemblies and more particularly relates to self-starting balance assemblies of the type utilized in electric watches or any type wherein the balance is detached from the train except at impulsing or locking.

It is frequently necessary to provide timing devices or timepieces for mounting in housings or vehicles intended for rapid movement so that the timing devices or timepieces are subjected to the forces resulting from such movements. In such a situation it is often found that the effect of the movement is to stop the timepiece and that restarting upon cessation of movement is uncertain and unreliable.

The balance assembly of the present invention provides a positive self-starting torque in such an environment without resorting to complex or costly self-starting mechanisms. As a matter of fact, the balance assembly of the present invention provides such self-starting characteristics while maintaining a structural appearance almost undetectably similar to the appearance of similar devices without the self-starting feature. As a result, the self-starting characteristic is obtained without the addition of any moving elements and at substantially the same cost as balance assemblies of the previously conventional types.

The invention is particularly adapted to use in substantially zero gravity systems such as are encountered in space although the device has utility within gravitational fields. Briefly described, the device consists of an isochronal mechanism which includes a balance assembly having a balance mounted on a staff which is associated with a restoring force device wherein the restoring force device comprises an apparatus having a rest position and capable of exerting a force tending to return the balance assembly to the rest position after it has been moved therefrom. As a special feature of the invention the balance assembly has means associated therewith to cause the center of gravity of the balance assembly to be spaced from the axis of rotation of the staff.

It is accordingly a primary object of the present invention to provide a positive self-starting balance assembly.

It is another object of the invention to provide a positive self-starting balance assembly which is particularly suited to operation in a substantially zero gravity environment.

It is another object of the invention to provide a balance assembly comprising a balance mounted on a staff connected to a hairspring with means associated with the balance assembly to cause the center of gravity of the assembly to be deliberately spaced from the axis of the staff.

It is another object of the invention to provide an isochronal device which consists of a balance assembly including a balance mounted on a staff which is associated with a restoring force means, wherein the restoring force means comprises a device having a rest position and is capable of exerting a force tending to return to the rest position when moved therefrom, and further including means associated with the balance assembly to cause the center of gravity of the balance assembly to be spaced from the axis of the staff.

It is another object of the invention to provide a self-starting balance assembly substantially no more costly than an equivalent balance assembly without the self-starting feature.

It is still another object of the invention to provide a balance assembly having a self-starting feature which does not require the use of additional moving parts and which does not require any costly additions to conventional balance assembly structures.

These and other objects and advantages of the invention will become more apparent upon reference to the following specification and claims and the appended drawings wherein:

FIGURE 3 is a plan view of a balance assembly mounted within a housing subjected to rotation, with the housing shown in diagrammatic form, and illustrating the position of the center of gravity of the balance wheel as the housing spins; and FIGURE 4 is a plan view of a balance assembly constructed according to the present invention mounted within a housing intended to be subjected to spin but with the housing in a stationary position, illustrating specifically the rest position of the balance assembly.

Figure 1:
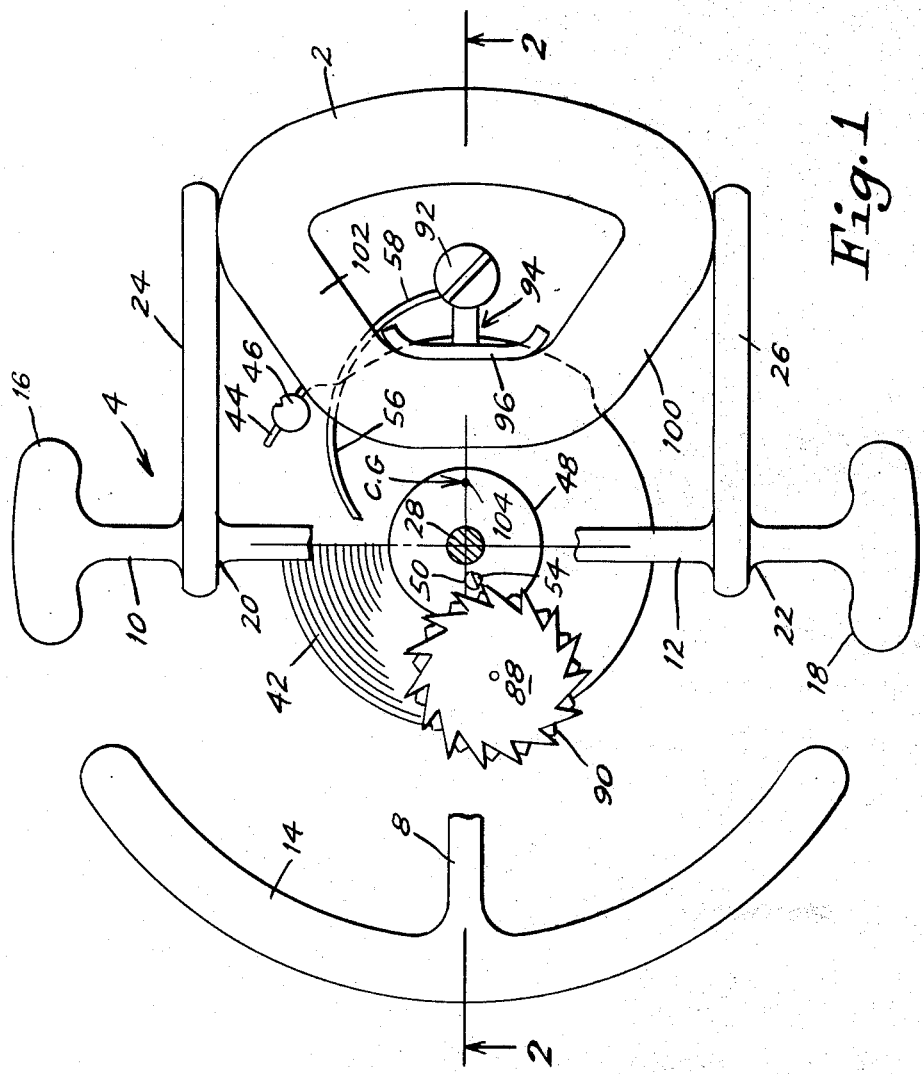
FIGURE 1 is a plan view of a balance assembly constructed according to the present invention.
Figure 2:
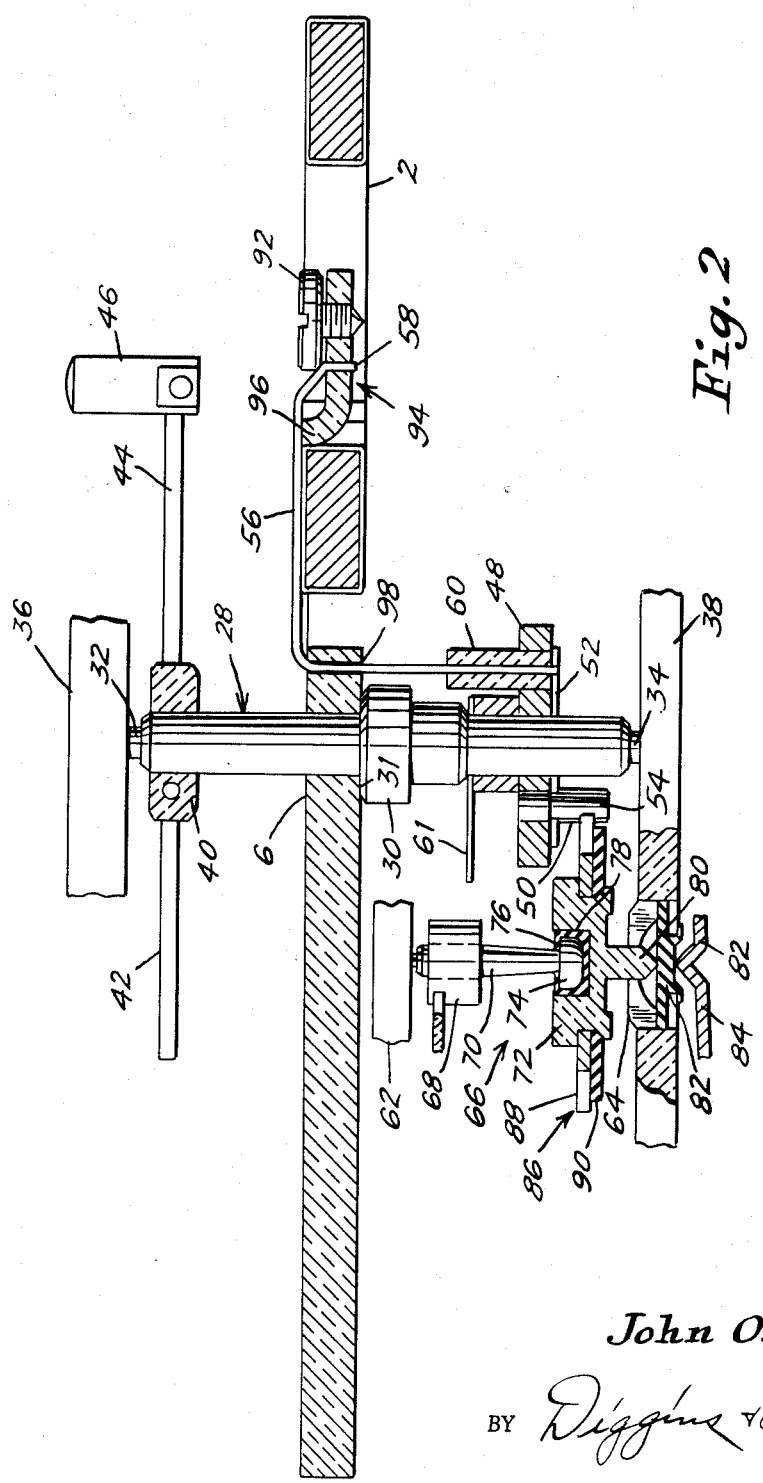
FIGURE 2 is a vertical cross-section of the balance assembly of FIGURE 1 taken along the line 2—2 of FIGURE 1.

Referring particularly to FIGURES 1 and 2, there is shown an electrically impulsed balance assembly constructed according to the present invention. It is to be understood that an electrically impulsed balance assembly constitutes the preferred embodiment of the invention but that the invention is not limited to this type of impulsing and that other types may be utilized. Referring now to the details of FIGURES 1 and 2, a coil 2 of generally sector shape is mounted on a skeletal type balance wheel indicated generally at 4. The balance wheel 4 has a central or hub portion 6 (FIGURE 2) from which a central arm 8 and two side arms 10 and 12 radiate. The central arm 8 is provided with an arcuate rim section 14 while the side arms 10 and 12 are provided with shorter rim sections 16 and 18. The side arms 10 and 12 have intermediate their ends widened portions 20 and 22 to which are attached coil support arms 24 and 26 which are preferably resilient to provide a resilient mounting for the coil 2. Such a resilient mounting permits movement of the coil 2 with respect to the balance when the assemblage is subjected to shock or movement and prevents breakage of the coil mounting. The rim section 14 on the central arm 8 is of sufficient weight, when taken together with the arm 8, to balance the weight of the coil 2 and its mounting arms 24 and 26. The shortened rim sections 16 and 18 on the side arms 10 and 12 are preferably disposed on the same circle as the rim section 14 and are of the same radius of curvature. These sections are balanced and contribute to the balance and poise of the balance wheel and to its total moment of inertia.

The balance 4 is mounted on a balance staff 28 having an integral shoulder 30 which provides an upper surface 31 to insure proper balance elevation and to guarantee that the plane of the balance is perpendicular to the balance staff axis. The bearing ends 32 and 34 are suitably received in jeweled bearings (not shown) in plates 36 and 38 which form a portion of the timepiece frame. A collar 40 is friction fitted on the upper end of the staff 28 and receives the inner end of a conventional hairspring 42. The other end 44 of the hairspring 42 is secured to a hairspring stud 46 mounted on the timepiece frame.

Also attached to the balance staff 28 is an index roller 48 which may comprise a split collar of the type shown in United States Patent No. 2,806,908. This roller has friction fitted therein a semi-cylindrical jewel pin 50. A contact plate 52 is attached to the underside of the index roller 48 by any suitable insulating adhesive, such as an epoxy resin. The contact plate is accurately apertured to permit the jewel pin 50 to pass therethrough. A semi-cylindrical contact 54 depends from the contact plate 52. This contact may either be formed integrally with the contact plate (such as being formed as a swaged D pin) or permanently joined therewith, for example, by welding. The diameter of the jewel pin is preferably larger than that of the contact in order to prevent inadvertent contact at undesired times. A wire 56 is attached at its upper end 58 to one terminal of the coil in a manner to be described and the other end is pierced through a tube 60 which is carried by the roller 48. The tube 60 is preferably formed of an insulating material and protects the wire 56 and also cooperates with a finger block 61 to provide motion limiting that forms no part of this invention. Electrical connection between wire 56 and contact plate 52 may be established in any desired manner, such as by solder on the underside of the contact plate, the wire passing through an aperture in the contact plate.

Referring more particularly to FIGURE 2, the plate 38 and an additional plate 62 support an upper jewel bearing (not shown) and a lower jewel bearing 64 and an index assembly shown generally at 66. This index assembly consists of an index pinion 68, staff 70, and index hub 72. The staff 70 is provided with an enlarged splined end 74 which is received in a recess 76 in the index hub 72. The spline 74 is fastened to the hub 72 by means of any suitable resin 78, which is preferably an epoxy resin. The index hub is provided with a bearing extension 80 which engages a contact plate 82 friction fitted into an aperture in the plate 38, the underside of the contact plate 82 being engaged by a contact spring 84 connected to the source of power for the timepiece.

The index hub 72 carries a composite index wheel generally indicated at 86 and consisting of an upper toothed alloy contact wheel 88 and a lower toothed wheel 90 mounted in abutting relationship. The wheel 90 is formed of a ferro-magnetic material and has a smaller diameter than the alloy contact wheel 88. These wheels are arranged so that their teeth are staggered in relation to one another as best seen in FIGURE 1. The ferro-magnetic wheel 90 is basically a star wheel having teeth which are symmetric relative to a radius. The alloy contact wheel 88, on the other hand, preferably has non-symmetric teeth which are best illustrated in FIGURE 1. The teeth of the alloy wheel extend into the path of movement of the jewel pin 50 and contact 54 carried by the roller 48, while the teeth of the lower magnetic index wheel 90 do not extend into this path. One or more small index magnets (not shown) may be frictionally carried by the lower plate 38 beneath the index wheel 86 to provide detenting and to pull the index assembly downwardly so that the pivot 64 maintains continuous electric contact with the contact plate 82.

In an electric timepiece of the type illustrated in U.S. Patent No. 2,806,908, it is desired to provide electric energization of the balance staff coil during a short period of time as the balance wheel and staff oscillate in one direction. During the return oscillation, it is ordinarily desired that no contact be made, although it is possible to design electric timepieces to operate with an impulse in both directions. The instant contact and index system is designed to transform the oscillating motion of the balance into one way rotary motion of the composite index wheel 86 and to cause a uniform limited time duration energization of the coil carried by the balance as the balance oscillates in one direction only. Indexing of the index wheel 86 is carried out during this oscillation.

The upper end 58 of the wire 56 is held in electrical connection with one end of the coil 2 by a screw 92 received in a connection bracket 94 having a rim-like portion 96 adhesively secured to the inner edge of the coil with which it makes electrical contact. The wire 56 is passed through an aperture 98 in the hub 6 of the balance. The other end of the coil 2 may be connected to the frame of the watch in any desired fashion, as, for example, through the mounting arm 24, side arm 10, hub 6, balance staff 28, collar 40, hairspring 42 and stud 46. The complete electrical circuit from the source of impulsing power, which is preferably a battery, extends as follows: contact spring 84, contact plate 82, pivot 80, hub 72, contact wheel 88, contact pin 54, contact plate 52, wire 56, connection bracket 94, coil 2, support arm 24, side arm 10, hub 6, balance staff 28, collar 40, hairspring 42, and stud 46. The two ends of the circuit are of course connected to the power source which, as stated, is preferably a battery.

In operation, when the balance oscillates in a counter-clockwise direction the contact post 54 engages a tooth on the contact wheel 88 thereby closing the electrical circuit to the coil and providing an impulse in conjunction with stationarily mounted permanent magnets which create magnetic fields through the generally radial legs 100 and 102 of the coil 2. The balance continues its oscillation in a counterclockwise direction, with the contact being broken as the contact post 54 moves out of engagement with the tooth of the contact wheel 88. The motion of the balance is reversed by the hairspring 42 and on the reverse or clockwise swing, the contact wheel 88 is engaged by the jewel pin 50 so that no contact is made and no impulsing occurs. The balance motion is again reversed by the hairspring 42 and the process repeated to provide isochronal oscillation of the balance assembly. In the conventional type of balance assembly, the balance would be balanced and poised about the axis of oscillation. According to the present invention, however, the contact screw 92 is of a weight sufficient to shift the center of gravity of the balance from the axis of rotation to the point indicated at 104 in FIGURE 1, a condition which is generally unsatisfactory in conventional watch movements.

According to the present invention, however, the balance assembly of FIGURES 1 and 2 is designed for mounting in a housing 106 which is shown diagrammatically in FIGURES 3 and 4. Referring to FIGURE 3 the balance assembly is shown generally at 108 in the position it would ocupy if the housing 106 is rotated so as to apply a force along the arrow 110. The balance assembly and its associated contact index mechanism is so disposed that this position of the balance tenses the hairspring 42 by reason of movement of the center of gravity 104 of the balance assembly to the position shown on a radial line extending from the axis of rotation 112 of the housing 106. Depending upon the rate of rotation of the housing 106 and the moment of inertia of the balance assembly 108, the balance will either be held stationarily in this position during the rotation of the housing or will oscillate at a reduced motion due to the effect of the force 110. At such time as the rotation decreases, the motion of the balance will increase, either starting from zero or from the reduced motion condition, due to the energy stored in the hairspring 42. This energy is adequate to rotate the balance 90° to the position shown in FIGURE 4 wherein contact is established between the contact wheel and the contact stud to cause electrical impulsing of the balance and thereby assure self-starting.

While not limited thereto, this mode of operation finds its greatest utility in missiles or satellites wherein the missile or satellite housing is deliberately subjected to a spin during launching but subsequently is caused to cease spinning or at least to spin at a very slow rate which will not affect the isochronal characteristics of the balance. This no-spin condition of the missile or satellite normally occurs after the housing has reached a substantially zero gravity environment in space and, at this time, the balance assembly is completely isochronal since the off center of gravity does not produce the non-isochronal effects which would be experienced with random positioning of the balance assembly in the gravitational field of the earth. The timepiece may therefore be utilized as a timer to compute time from the moment it restarts in space or from any moment preceding launching where the "dead" time may be subtracted from the indicated lapsed time shown by the timepiece, this "dead" time being generally known to an accurate degree and being generally of quite short duration. It is also possible with this arrangement to secure continuous operation of the timepiece during the rotation of the housing if the combination of rate of rotation and moment of inertia of the balance is not such as to completely stop oscillation of the balance assembly during the rotational period. In addition to finding use in a substantially zero gravity environment, the balance assembly of the invention may also be utilized within a gravitational field if the unit is stationarily mounted with the axis of the balance lying on a radius through the center of the mass creating the gravitational field. The unit may then be rotated about this radius and will provide the same effect as just described in entering a substantially zero gravity environment.

It will be appreciated from the foregoing that the device of this invention provides positive self-starting and that the only modification in the constructional features of the balance assembly which is necessary is a change in size of the screw 92. This change may obviously be effected for no cost other than the cost of the increased metal in the screw, which will be recognized as negligible. When the balance assembly is then mounted in the housing which is to be subjected to rotation in the manner described in conjunction with FIGURES 3 and 4, there is provided a positive acting self-starting timepiece. While only rotational motion has been discussed, it will be obvious to those skilled in the art that the device may find utility in conjunction with linear or other motions so long as the disposition of the rest position of the balance and the contact position and the center of gravity are appropriately disposed. As an example, the force 110 illustrated in FIGURE 3 may be produced by an acceleration of the housing 106 in an opposite direction as well as by rotation of the housing in either direction. In the preferred embodiment, the contact and energization of the coil occurs substantially at the rest position of the hairspring or at the position of the hairspring wherein no tension exists which would cause the balance assembly to rotate in either direction. Again in a preferred embodiment, this rest position and contact position of the hairspring and contact system is disposed at a position 90° removed from the position into which the balance is moved under the influence of the force created by movement of the housing. While the balance assembly has been described in connection with a hairspring for providing the restoring force, it is within the contemplation of the invention that other restoring force devices may be utilized, such as magnetic devices. Also, while the device has been described in conjunction with an electric impulsing mechanism, it is to be realized that the invention is equally satisfactory with any escapement system wherein the balance is detached from the train except at impulsing or locking.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A balance assembly comprising a self starting movement comprising a housing intended to be rotated in such a manner as to create a centrifugal force on anything therein which is not axially located, a balance assembly non-axially mounted within said housing, said balance assembly comprising a balance mounted on a staff which is associated with a restoring force means, said restoring force means comprising a device having a rest position and capable of exerting a force tending to return to the rest position when moved therefrom, and means associated with said balance assembly to cause the center of gravity of said balance assembly to be spaced from the axis of said staff, said means associated with said balance assembly and said restoring force means being disposed such that said centrifugal force tends to move said means associated with said balance assembly to its outermost position relative to the axis of rotation of said housing, said rest position being substantially 90 degrees removed therefrom, so that said centrifugal force tenses said restoring force means to create a restoring force which acts to increase the arc of oscillation of said balance assembly when said centrifugal force is reduced.

2. A device as set out in claim 1 wherein said movement is electrically driven by an electric impulsing means, said impulsing means comprising coil means and magnet means and switch means, said switch means being associated with said balance assembly in a manner to close a circuit to said coil means when said balance assembly is substantially at the rest position of said restoring force means, said restoring force means comprising hairspring means.

3. A device as set out in claim 2 wherein the axis of rotation of said balance is disposed parallel to the axis of rotation of said housing.

4. A balance assembly comprising a self-starting movement comprising a housing intended to be rotated in such a manner as to create a centrifugal force on anything therein which is not axially located, a balance assembly non-axially mounted within said housing, said balance assembly comprising a balance mounted on a staff which is associated with a restoring force means, said restoring force means comprising a device having a rest position and capable of exerting a force tending to return to the rest position when moved therefrom, and means associated with said balance assembly to cause the center of gravity of said balance assembly to be spaced from the axis of said staff, said means associated with said balance assembly and said restoring force means being disposed such that said centrifugal force tends to move said means associated with said balance assembly to its outermost position relative to the axis of rotation of said housing, said rest position of said balance being rotationally removed from the position of said balance when said means is in its outermost position, so that said centrifugal force tenses said restoring force means to create a restoring force which acts to increase the arc of oscillation of said balance assembly when said centrifugal force is reduced.

5. A device as set out in claim 4 wherein said movement is electrically driven, and said restoring force means comprises hairspring means.

6. A device as set out in claim 5 wherein the axis of rotation of said balance is disposed substantially parallel to the axis of rotation of said housing.

7. A balance assembly comprising a self-starting movement comprising a housing intended to be rotated in such a manner as to create a centrifugal force on anything therein which is not axially located, a balance assembly non-axially mounted within said housing, said balance assembly comprising a balance mounted on a staff which is associated with a restoring force means, said restoring force means comprising a device having a rest position and capable of exerting a force tending to return to the rest position when moved therefrom, and means associated with said balance assembly to cause the center of gravity of said balance assembly to be located at a point spaced from the axis of said staff, said means associated with said balance assembly and said restoring force means being disposed such that said centrifugal force tends to move said point to an outermost position remote from said rest position relative to the axis of rotation of said housing, said rest position being rotationally removed from said outermost position, so that said centrifugal force tenses said restoring force means to create a restoring force which acts to increase the arc of oscillation of said balance assembly when said centrifugal force is reduced.

8. A device as set out in claim 7 wherein said movement is electrically driven, and said restoring force means comprises hairspring means.

9. A device as set out in claim 8 wherein the axis of rotation of said balance is disposed substantially parallel to the axis of rotation of said housing.

10. A device as set out in claim 7 wherein said movement is electrically driven by an electric impulsing means, said impulsing means comprising coil means and magnet means and switch means, said switch means being associated with said balance assembly in a manner to close a circuit to said coil means when said balance assembly is substantially at the rest position of said restoring force means, said restoring force means comprising hairspring means.

References Cited by the Examiner
UNITED STATES PATENTS

| | | | |
|---|---|---|---|
| 1,214,068 | 1/17 | Prahl | 58—117 X |
| 2,833,348 | 5/58 | Almquist | 58—145 |
| 2,952,117 | 9/60 | Reece et al. | 58—28 |
| 2,978,982 | 4/61 | Bianchi | 102—79 |
| 3,059,577 | 10/62 | Hutchinson et al. | 102—84 |

LEYLAND M. MARTIN, *Primary Examiner.*
JOSEPH P. STRIZAK, ROBERT L. EVANS,
*Examiners.*